United States Patent [19]

Makrucki

[11] Patent Number: 5,548,581
[45] Date of Patent: Aug. 20, 1996

[54] SYSTEM AND METHOD FOR MAKING CONNECTION ACCEPTANCE/REJECTION DECISIONS IN A COMMUNICATION SYSTEM

[75] Inventor: Brad A. Makrucki, Peachtree City, Ga.

[73] Assignee: BellSouth Corporation, Atlanta, Ga.

[21] Appl. No.: 292,238

[22] Filed: Aug. 17, 1994

[51] Int. Cl.[6] .............................. H04J 3/14; H04L 12/56
[52] U.S. Cl. ......................... 370/17; 370/60.1; 370/94.2; 370/84
[58] Field of Search .............................. 370/17, 60, 60.1, 370/94.1, 94.2, 94.3, 58.2, 110.1, 84; 379/220

[56] References Cited

U.S. PATENT DOCUMENTS

| | | | |
|---|---|---|---|
| 4,799,211 | 1/1989 | Felker et al. ................... | 370/17 |
| 4,984,264 | 1/1991 | Katsube ........................... | 379/197 |
| 5,153,764 | 10/1992 | Faulkner et al. ................ | 359/136 |
| 5,253,288 | 10/1993 | Frey et al. ....................... | 379/221 |
| 5,335,222 | 8/1994 | Kamoi et al. .................... | 370/60 |
| 5,341,366 | 8/1994 | Soumiya et al. ................. | 370/17 |
| 5,357,507 | 10/1994 | Hughes et al. ................... | 370/60 |
| 5,408,465 | 4/1995 | Gusella et al. ................... | 370/17 |

*Primary Examiner*—Hassan Kizou
*Attorney, Agent, or Firm*—Robin, Blecker, Daley & Driscoll

[57] ABSTRACT

A communication system in which connection acceptance/rejection decisions with respect to an aggregating network coupling traffic from a traffic source to an outgoing communication link are reached based on parameters which include a parameter indicative of the burstiness of the traffic from the traffic source.

71 Claims, 4 Drawing Sheets

SYSTEM AND METHOD FOR MAKING CONNECTION ACCEPTANCE/REJECTION DECISIONS IN A COMMUNICATION SYSTEM

BACKGROUND OF THE INVENTION

This invention relates to communication systems and, in particular, to communication systems which utilize aggregating networks to couple traffic from traffic sources to destinations.

In modern communication systems, the transfer of traffic from a traffic source to a destination often involves passage of the traffic through various types of aggregating networks. In a typical communication system, the aggregating networks are formed by switching systems which include aggregating elements such as multiplexors, concentrators and/or digital switches.

An aggregating network is shared by the traffic from many traffic sources. Accordingly, before an aggregating network can act on a connection request of a traffic source, a connection acceptance/rejection decision must be made. If the connection acceptance/rejection decision is to accept a connection request, the traffic from the requesting traffic source is coupled by the aggregating network to the outgoing link associated with the connection request. If the connection acceptance/rejection decision is to reject the connection request, the aggregating network is inhibited so that no coupling of traffic occurs.

In present communication systems, in order to safeguard against the loss of information, the connection acceptance/rejection decisions are made based on maintaining the sustainable rate, i.e., the mean or average rate, of traffic on an outgoing link at or below a preselected percentage, e.g., 50%, of the maximum link rate. Thus, if the additional traffic from a traffic source would result in a sustainable rate of traffic which exceeds the preselected percentage of the maximum link rate, the connection request is rejected. On the other hand, if the additional traffic would result in a sustainable rate which is less than the preselected percentage of the maximum link rate, the connection request is accepted.

The use of the aforesaid criteria, i.e., maintaining the traffic on an outgoing link at or below a preselected percentage of the maximum link rate, indirectly attempts to account for the so-called "burstiness" of the traffic on a link. Burstiness refers to the variance of or changes in the arrival rate of traffic arriving on a link. By providing a wide margin between the actual sustainable rate and the maximum link rate, there is a good likelihood that any burstiness or variance from the sustainable rate will not cause the maximum link rate to be exceeded. However, by not directly accounting for the burstiness of traffic on a link, the link is still susceptible to loss of information due to bursts of traffic. Moreover, by operating a link well below its maximum link rate, link capacity is wasted and operating efficiency is lessened.

It is, therefore, an object of the present invention, to provide a communication system with an improved ability to make connection acceptance/rejection decisions.

It is a further object of the present invention to provide a communication system in which connection acceptance/rejection decisions are made in a manner which efficiently utilizes the outgoing telephone links of the system.

It is a further object of the present invention to provide a communication system in which connection acceptance/rejection decisions are made in a relatively simple and easy manner.

It is yet a further object of the present invention to provide a communication system in which connection acceptance/rejection decisions take direct account of the burstiness of traffic on a link.

SUMMARY OF THE INVENTION

In accordance with the principles of the present invention, the above and other objectives are realized in a communication system in which a connection acceptance/rejection decision for a traffic source is made based upon traffic parameters which include a parameter indicative of the burstiness of traffic from the traffic source. Specifically, these traffic parameters include so-called "basic traffic parameters" defined by the sustainable rate of traffic from the traffic source, the peak rate of traffic from the traffic source and a burst length parameter for traffic from the traffic source. The latter burst length parameter is, preferably, the maximum burst length of the traffic from the traffic source and/or a parameter related to the probability distribution of such burst length.

Using these basic traffic parameters and other traffic parameters which may include the maximum link rate and link buffer size accessible to an outgoing link, a controller of the communication system responding to a connection request from a traffic source makes a connection acceptance/rejection decision. Based on this decision, the controller then allows an aggregating network to or inhibits an aggregating network from coupling the traffic from the traffic source to the outgoing link.

In further accord with the invention, as part of the process for reaching its connection acceptance/rejection decision, the controller maintains first and second current link parameters for an outgoing link. These parameters are indicative, respectively, of the steady-state mean/average (sustainable rate) of traffic currently on the link and the steady-state variance/burstiness (average of changes from the sustainable rate) of traffic currently on the link.

With no traffic on an outgoing link, the first current link parameter is initially set by the controller to minus the maximum link rate and the second current link parameter is initially set by the controller to zero. With traffic on an outgoing link, the controller resets the first and second current link parameters by adding to the initially set parameters, further parameters which are determined using the basic traffic parameters of the traffic sources currently on the link.

In the embodiment of the invention to be disclosed hereinafter, when a connection request associated with a given traffic source and given outgoing link is received, the controller determines from the first and second current link parameters for the given link, first and second new link parameters. This determination is made by selectively utilizing the basic traffic parameters of the given traffic source and the maximum link rate and buffer size accessible to the given link. The controller also utilizes the first and second current link parameters and selected ones of the basic traffic parameters of the given traffic source, to determine first and second transient link parameters indicative of the transient mean/average of traffic on the given link and the transient variance/burstiness of traffic on the given link, respectively. Based on these determined parameters, i.e., the first and second new link parameters, the first and second transient link parameters, and the basic parameters of the given traffic source, the controller then makes a connection acceptance/rejection decision as to whether traffic from the given traffic source is to be coupled to the given outgoing link.

Also, in the embodiment of the invention to be disclosed hereinafter, the basic traffic parameters of a traffic source are contained in a traffic descriptor which is made available to the controller when the controller is responding to a connection request. The first new link parameter is determined by the controller adding to the first current link parameter, the sustainable traffic rate of the requesting traffic source. The second new link parameter, in turn, is determined by the controller adding to the second current link parameter a traffic variance/burstiness parameter for the requesting traffic source calculated by using a preselected variance/burstiness algorithm, the basic traffic parameters of the traffic source and the maximum link rate of and buffer size accessible to the outgoing link. The controller further determines the first transient link parameter by adding to the first current link parameter the peak rate of the requesting traffic source and the second transient link parameter by making it equal to the second current link parameter.

The controller then utilizes the determined values and an acceptability algorithm to make its connection acceptance/rejection decision. Using the acceptability algorithm, the controller calculates from the basic traffic parameters, the first and second new link parameters and the first and second transient link parameters, a quality of service parameter. The controller then compares the calculated quality of service parameter with the quality of service parameter of the requesting traffic source. If the calculated quality of service parameter equals or exceeds the quality of service parameter of the requesting traffic source, the controller outputs a connection acceptance decision. If not, the controller outputs a connection rejection decision.

In the disclosed embodiment, in addition to the controller outputting the connection acceptance/rejection decision, the controller can also output the quality of service parameter derived from the acceptability algorithm.

BRIEF DESCRIPTION OF THE DRAWINGS

The above and other features and aspects of the present invention will become more apparent upon reading the following detailed description in conjunction with the following drawings, in which.

DETAILED DESCRIPTION

Figure 1:
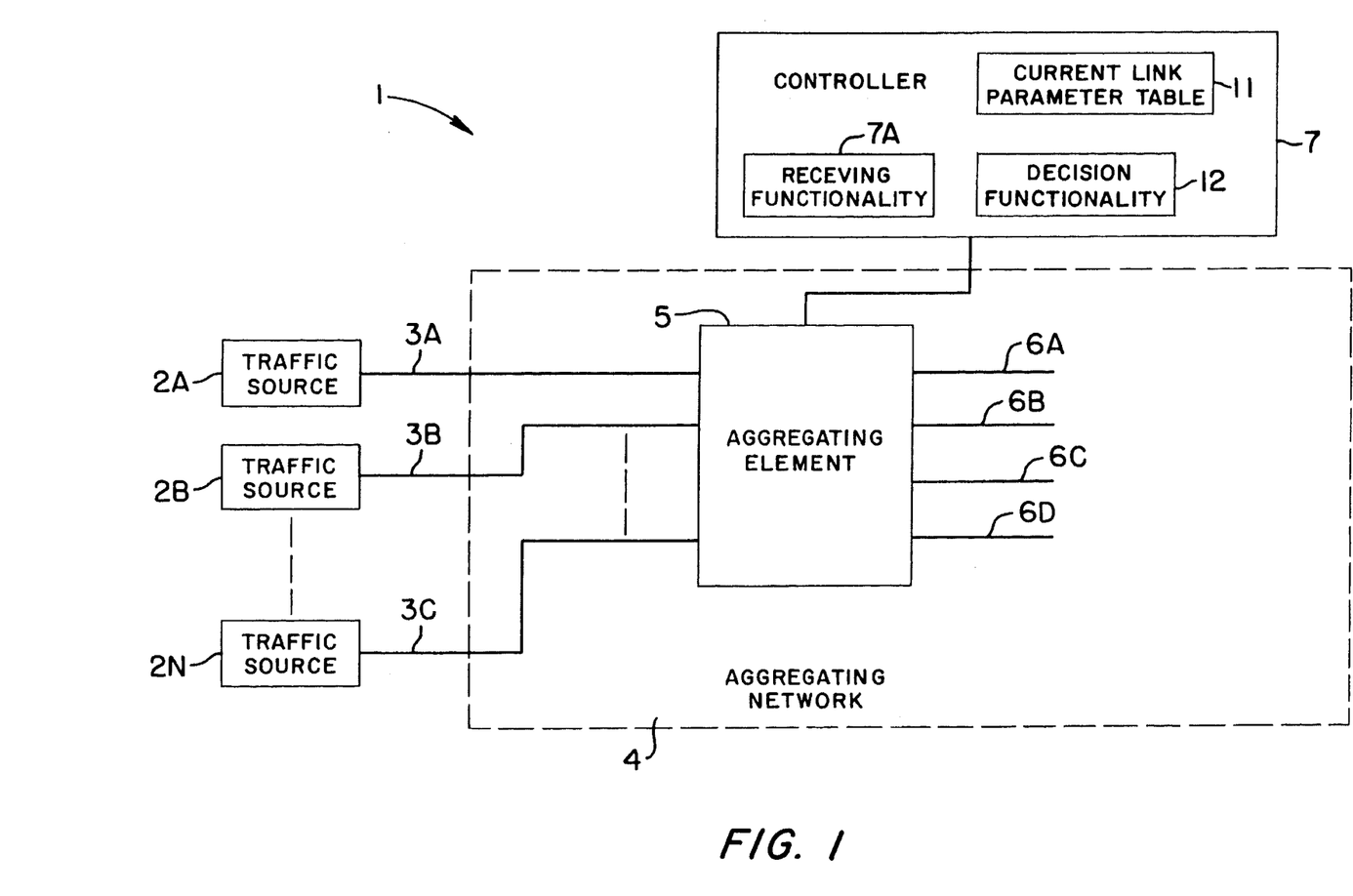
FIG. 1 illustrates a communication system adapted to make connection acceptance/rejection decisions in accordance with the principles of the present invention.

FIG. 1 shows schematically a communication system 1 in accordance with the principles of the present invention. As shown, a plurality of traffic sources 2A, 2B, 2C, . . . 2N provide traffic to the system 1 via connecting links 3A, 3B, 3C . . . 3N. The links 3A to 3N connect the traffic from the sources 2A to 2N to an aggregating element 5 of an aggregating network 4 of the system 1. The aggregating element 5 can couple the traffic received on the incoming links 3A to 3N to any one of a number of outgoing links 6A to 6D, which are lesser in number than the incoming links.

A controller or control system 7 is provided for controlling the aggregating network 4 and aggregating element 5. More particularly, the controller 7 makes connection acceptance/rejection decisions as to whether the traffic from a given one of the traffic sources 2A to 2N can be coupled by the element 5 to a given one of the outgoing links 6A to 6D. When the controller 7 outputs a connection acceptance decision, the controller allows the requested coupling by the aggregating element 5. When a connection rejection decision is output, the controller 7 disallows or inhibits the element 5 from making such coupling.

As can be appreciated, the traffic sources 3A to 3N can be any number of components which generate communication traffic. Moreover, these sources can be part of the communication system 1 or can be external to the system and part of another communication or other system. Typical traffic sources might be terminal devices, such as, for example, computers, video coders/decoders and telephone stations. Also, other communication system elements such as, for example, switching systems, multiplexors and concentrators, might serve as traffic sources.

The aggregating network 4 might typically be a switching network. Also, the aggregating element 5 might be a standard element found in such a switching network. Typical elements might be digital switches, multiplexors and concentrators.

As above-indicated, the controller 7 makes a connection acceptance/rejection decision in response to a request that the traffic from one of the traffic sources 2A to 2N be coupled by the aggregating element 5 to one of the links 6A to 6D. In accordance with the principles of the present invention, the controller 7 makes this decision based upon traffic parameters which include a parameter indicative of the burstiness or variance of the traffic from the traffic source. More particularly, in the present illustrative case, the controller 7 utilizes the following basic traffic parameters of the traffic source in making its decision: the peak rate of traffic from the traffic source, the sustainable rate of traffic from the traffic source and the maximum burst length of traffic from the traffic source.

In the illustrative system of FIG. 1, the basic traffic parameters of a traffic source are included in a traffic descriptor TD associated with the respective traffic source. This descriptor is included in the connection request made by the traffic source to the network 4 and is received with connection request in the receiving functionality 7A of the controller and then used by the controller 7 in making the connection acceptance/rejection decision.

In further accord with the invention, in making a connection acceptance/rejection decision the controller 7 also uses first and second current link parameters $\beta_{SSL}$ and $\alpha_{SSL}$, associated with the outgoing link. These parameters are indicative of the steady-state mean/average of the traffic currently on the outgoing link and the steady-state variance/burstiness of the traffic currently on the outgoing link. They are determined based upon selective ones of the basic traffic parameters of the traffic sources whose traffic is currently on the link.

More particularly, the second current link parameter $\alpha_{SSL}$ is calculated by summing the variance/burstiness parameters determined for the traffic sources currently on the outgoing link. The variance/burstiness parameter $\alpha_\tau$ for a traffic source is, in turn, determined using a predetermined variance/burstiness algorithm and the basic traffic parameters (i.e., peak rate, sustainable rate and maximum burst length) for the traffic source and the maximum link rate of and buffer size accessible to the outgoing link.

The first current link parameter $\beta_{SSL}$ is determined from the sustainable rate parameter for each source on the link and from an initial first current link parameter, i.e., the first current link parameter with no traffic on the link, which is set equal to minus the maximum link rate. Specifically, the parameter $\beta_{SSL}$ is calculated by summing the individual sustainable rate parameters for these traffic sources and subtracting the maximum link rate, i.e., adding the initial first current link parameter.

The first and second current link parameters $\alpha_{SSL}$ and $\beta_{SSL}$ for the outgoing links 6A to 6D are maintained by the controller 7 in a current link parameter function table 11. This function table is called by the controller 7 to access the required parameter values when making a connection acceptance/rejection decision. Based upon the decision, the function table 11 is updated to indicate a change in the first and second current link parameters of an outgoing link, as will be discussed in greater detail below.

As above-indicated, when a connection request from a given one of the traffic sources 2A to 2N associated with connection of its traffic to a given one of the outgoing links 6A to 6D is received at the network 4, the request is delivered to controller 7 which acts on the request by allowing or disallowing coupling of the traffic by the aggregating element 5 to the given outgoing link. As also above-indicated, in acting on the request, the controller 7 utilizes the first and second current link parameters of the given link, the basic traffic parameters of the given source and the maximum link rate of and the buffer size accessible to the given link. In particular, in accord with the invention, the controller 7 utilizes the aforesaid parameters to calculate a set of further parameters from which the controller 7 can make its connection acceptance/rejection decision.

Figure 2:
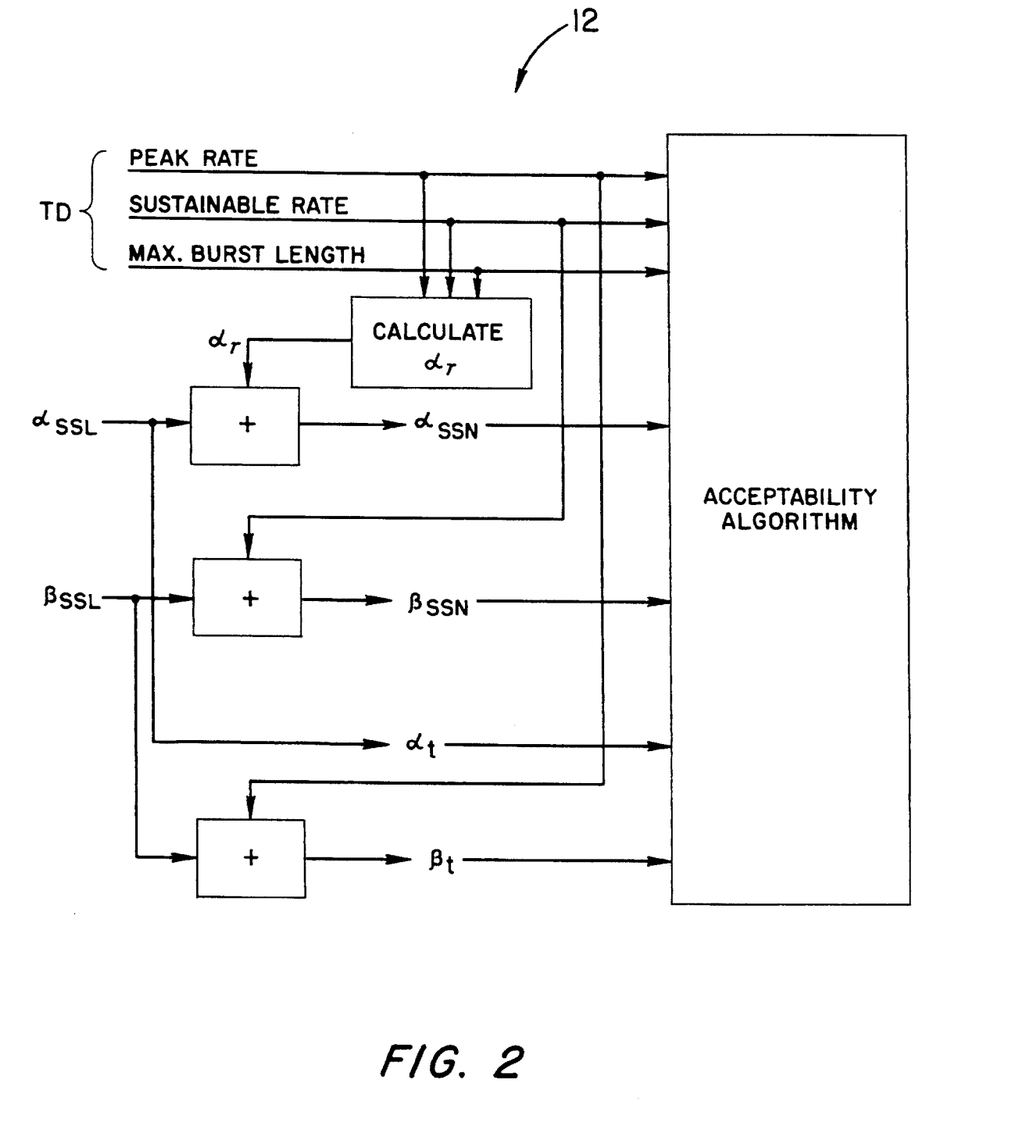
FIG. 2 shows in greater detail the acceptance/rejection decision functionality of the controller of the systems of FIG. 1.

FIG. 2 shows the controller decision functionality 12 in greater detail. As shown, the controller 7 determines first and second new link parameters $\beta_{SSN}$ and $\alpha_{SSN}$ and first and second transient link parameters $\beta_t$ and $\alpha_t$. The new second link parameter $\alpha_{SSN}$ is determined by first calculating the variance/burstiness parameter $\alpha_\tau$ for the given traffic source in the manner described above, i.e., by using the predetermined variance/burstiness algorithm and the peak rate, sustainable rate and maximum burst length parameters of the given traffic source and the maximum link rate and buffer size of the given link. The variance/burstiness parameter $\alpha_\tau$ for the given link is then added to the first current link parameter $\alpha_{SSL}$ to obtain the second new link parameter $\alpha_{SSN}$. The first new link parameter $\beta_{SSN}$ is, in turn, derived by adding to the first current link parameter $\beta_{SSL}$, the sustainable traffic rate of the given traffic source.

The transient parameters $\alpha_t$ and $\beta_t$ are indicative of the transient variance/burstiness and the transient mean/average of the traffic on the given link. The second transient link parameter is equal to the second current link parameter $\alpha_{SSL}$, while the first transient link parameter is derived by adding the peak rate of the given traffic source to the current first link parameter $\beta_{SSL}$.

Having determined the values of the parameters $\alpha_{SSN}$, $\beta_{SSN}$, $\alpha_t$ and $\beta_t$, the controller 7 then uses these values and the basic traffic parameters of the given traffic source to reach its connection acceptance/rejection decision. In the FIG. 2 decision functionality 12, this is carried out by the controller 7 via an acceptability algorithm. The latter algorithm correlates the determined combination of the traffic parameters $\alpha_{SSN}$, $\beta_{SSN}$, $\alpha_t$, $\beta_t$ and the basic traffic parameters with a so-called quality of service ("QOS") parameter. This parameter is identified as $QOS_T$ and defines a service level which would be realized with the corresponding combination of traffic parameters. Each traffic source 2A to 2N also has an associated quality of service, identified as $QOS_S$, which defines the level of service which must be provided to its traffic when coupled by an aggregating element to an outgoing link.

The controller 7 uses the acceptability algorithm to derive a $QOS_T$ for the determined combination of parameters $\alpha_{SSN}$, $\beta_{SSN}$, $\alpha_t$, $\beta_t$, peak rate, sustainable rate and maximum burst length. The controller 7 then determines that this $QOS_T$ is the QOS for the given outgoing link when carrying the added traffic as coupled to the outgoing link from the given traffic source by the aggregating element 4.

The controller 7 then compares the determined $QOS_T$ of the given link with the $QOS_S$ of the given traffic source. If the determined $QOS_T$ is equal to or exceeds the $QOS_S$ of the given traffic source, the controller 7 reaches a connection acceptance decision. The controller 7 then provides a connection acceptance output to the aggregating element 5 which allows coupling of the given traffic source to the given outgoing link.

When a connection acceptance decision is made, the controller 7 returns to the current link function parameter table 11 and updates the table for the given outgoing link. In particular, the first and second current link parameters are updated with the first and second new link parameters, which now become the current link parameters because of the addition of the traffic of the given traffic source to the given link.

When comparing the determined $QOS_T$ with the $QOS_S$ of the given traffic source, if the controller determines that the determined $QOS_{,T}$ is less than the $QOS_S$, then the controller 7 reaches a connection rejection decision. In this case, the controller 7 provides a connection rejection output to the aggregating element 5, which disallows or inhibits coupling of the traffic from the given traffic source to the given link. The connection request is thus denied, since it would not result in the QOS required by the traffic source.

For each connection acceptance/rejection decision rendered by controller 7, in addition to providing an acceptance or rejection output, the controller 7 could also output the determined $QOS_T$ on which the decision was based. This added information serves to provide insight as to the margin of difference between the determined $QOS_T$ and the $QOS_S$ of the traffic source for the communication system provider.

In accordance with the invention, the controller 7 is further adapted when making each connection acceptance/ rejection decision to assess whether the requested connection would affect the service provided to other traffic sources currently coupled to the given link. In particular, the controller 7 determines whether the requested connection would result in a $QOS_T$ for each of these other traffic sources which is below the $QOS_S$ for that traffic source.

One way of making this determination for a traffic source is for the controller 7 to use the acceptability algorithm to redetermine the $QOS_T$ for that source based upon the basic traffic parameters of that source, the previously determined $\alpha_t$ and $\beta_t$ parameters for that source, i.e., the $\alpha_t$ and $\beta_t$ determined when an acceptance decision was made permitting traffic from that source to be coupled to the given link, and the just determined $\alpha_{SSN}$ and $\beta_{SSN}$ parameters for the requesting source. If the redetermined $QOS_T$ of any traffic source is less than the $QOS_S$ of that traffic source, this indicates an unacceptable QOS condition for the traffic source, and the controller 7 reaches a connection rejection decision for the requested connection. This decision is reached, even in the case where the $QOS_T$ determined for the requesting source is not less than the $QOS_S$ of that source. In this way, new traffic being coupled to a link, does not result in an unacceptable QOS for other traffic sources already coupled to the link.

Figure 3:
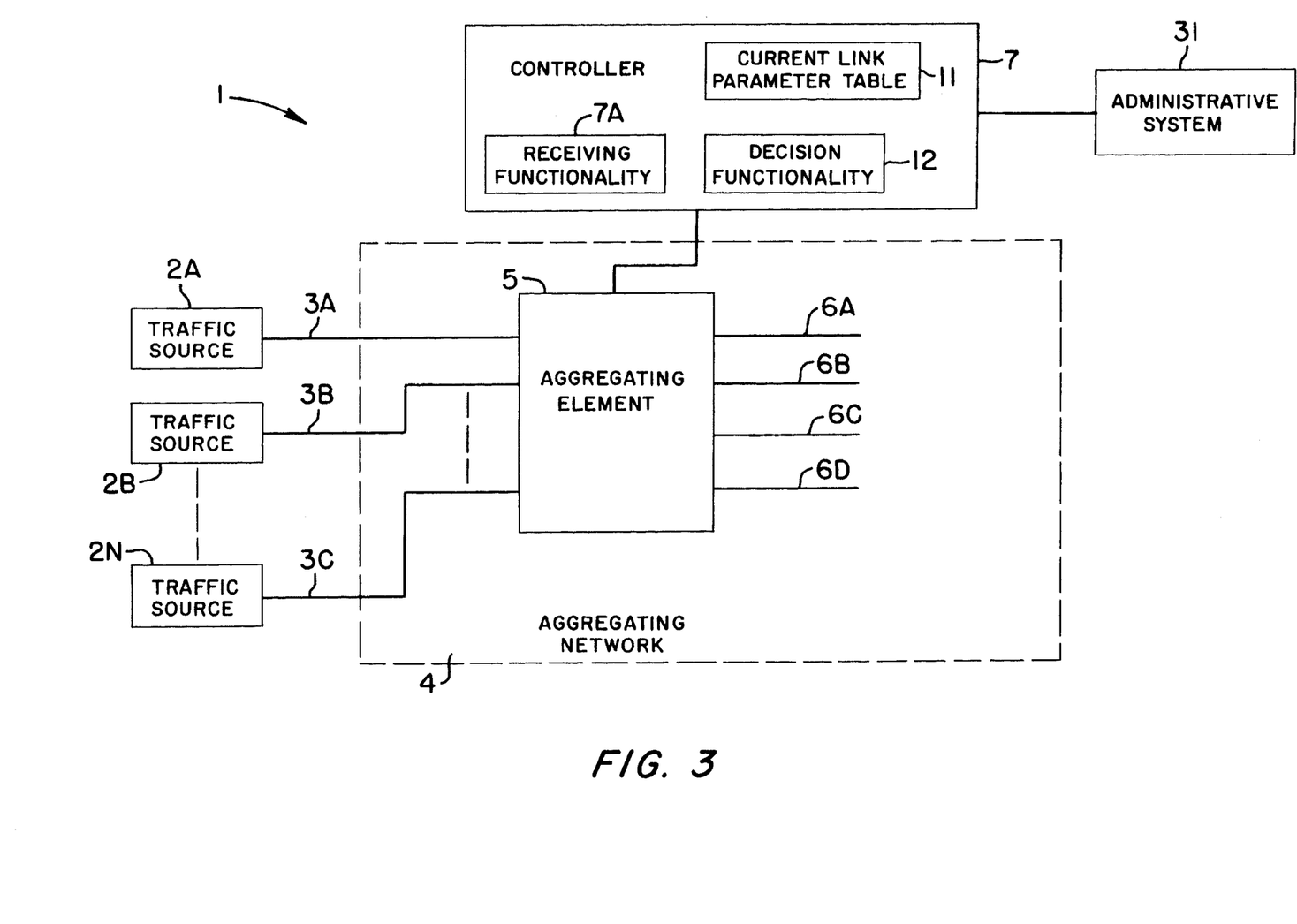
FIGS. 3 and 4 illustrate modified embodiments of the communication system of FIG. 1.

FIG. 3 shows a modification of the system of FIG. 1 in which an administrative system 31 has been added to the system and contains the traffic descriptors TD for the traffic sources 2A–2N. In this modification, when the network 4 receives a connection request, instead of the request containing the traffic descriptor TD for the requesting traffic source, the traffic descriptor is supplied by the administrative system 31. Otherwise, operation of the system 1 of FIG. 3 is the same as that of the system 1 of FIG. 1.

Figure 4:
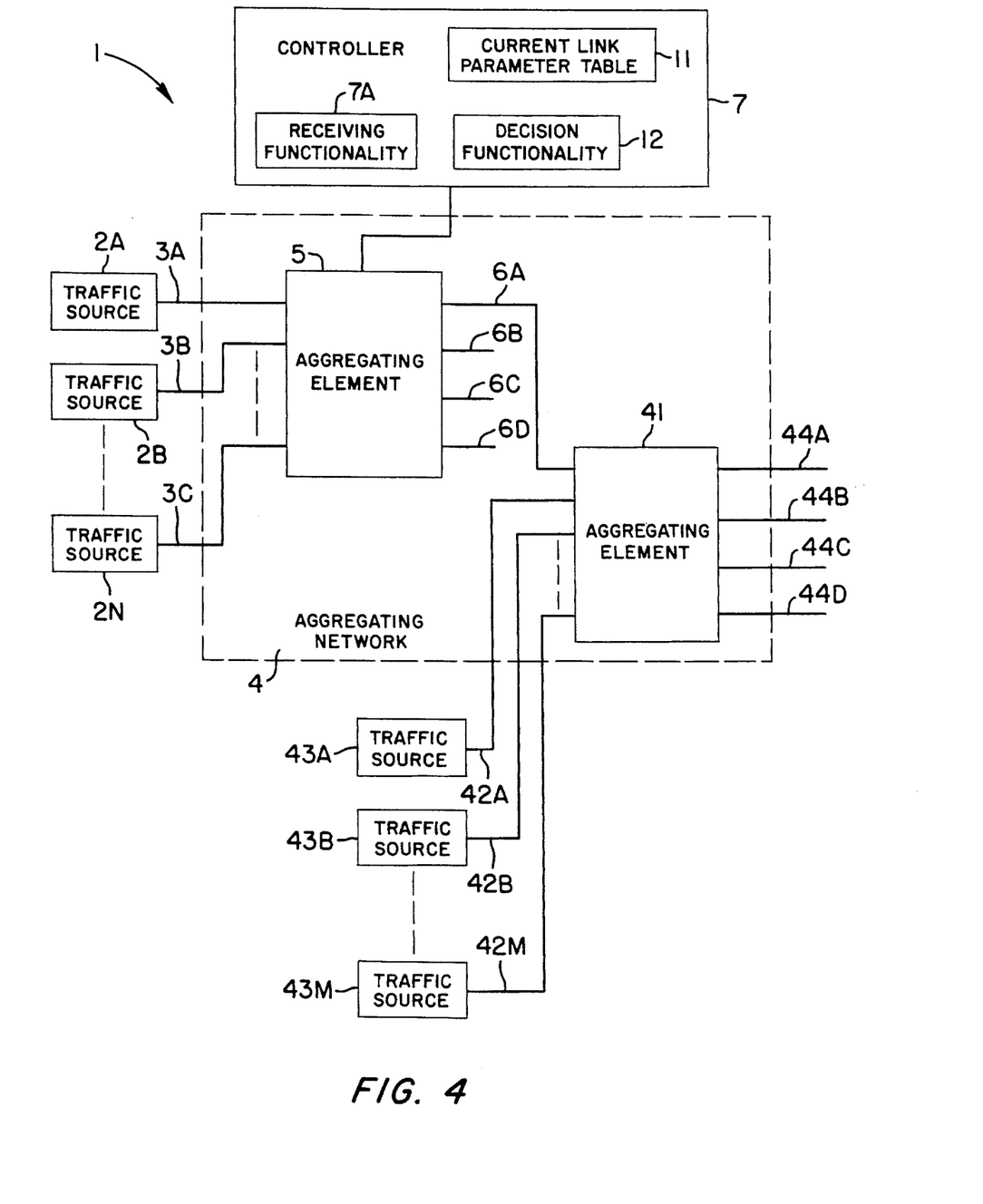

FIG. 4 shows a further modification of the system 1 of FIG. 1 in which a second aggregating element 41 is included in the switching network 4 and is also under control of the controller 7. The aggregating element 41 receives traffic over links 42A to 42M coupled to traffic sources 43A to 43M and also over outgoing link 6A of the aggregating element 5. The element 41 has outgoing links 44A to 44D to which it can couple traffic from the traffic sources 42A to 42M and from the link 6A.

In this modification, the controller 7 makes connection acceptance/rejection decisions for traffic to be coupled by the element 41 from the sources 43A to 43N and the link 6A to the outgoing links 44A to 44D in the same manner as it does for traffic coupled by the element 5 from the sources 2A to 2N to the links 6A to 6D. In particular, these decisions are made based upon the basic traffic parameters for the traffic sources 43A to 43M and derived basic traffic parameters for the link 6A. They are also based upon first and second current link parameters $\beta_{SSL}$ and $\alpha_{SSL}$ for the outgoing links 44A to 44D which are derived in the same manner as the first and second current link parameters for the links 6A to 6D. Finally, they are based upon first and second new link parameters $\beta_{SSN}$, $\alpha_{SSN}$ and first and second transient link parameters $\beta_t$, $\alpha_t$ also derived similarly to like parameters for the links 6A to 6D.

In the system of FIG. 4, when a connection request is made which is associated with both the outgoing link 6A and with any of the outgoing links 44A to 44D and, thus, requires coupling through both the elements 5 and 41, the controller 7 must make two connection acceptance/rejection determinations. One determination involves coupling through the element 4 to the link 6A and the other coupling through the element 41 to the given one of the outgoing links 44A to 44D required to be used to satisfy the connection request.

In each case, the determined $QOS_T$ must be equal to or greater than the $QOS_S$ of the requesting source. If the aforesaid condition is satisfied, a connection acceptance decision is reached and acceptance outputs are sent by the controller 7 to the elements 5 and 41, allowing coupling of the traffic through these elements. If the condition is not satisfied, the controller 7 reaches a connection rejection decision and connection rejection outputs are sent to the elements 4 and 41, inhibiting coupling through these elements.

The modified system 1 of FIG. 4 can additionally be further modified as in the FIG. 3 embodiment to provide an administrative processing system for providing the traffic descriptors for the traffic sources and the link 6A.

It should be noted that the communication system 1 of FIGS. 1 and 4 can be a telephone communication system or any other type of communication system which utilizes traffic sources, aggregating networks and outgoing links to carry traffic. Moreover, the traffic may be in the form of packets, bits or any other transmission unit.

A particular type of communication system in which the present invention has application is an Asynchronous Transfer Mode ("ATM") system. In an ATM system, a cell is used as the basic packet of information so that the traffic rates are in terms of cell rates (e.g., cells/sec.). Burstiness, which as defined above, is a quantification of the variance in traffic on a link, thus becomes for the ATM system the variance in the number of cells that arrive on a link, per time interval.

To determine the steady-state variance/-burstiness and the transient variance/burstiness of traffic using a link in an ATM system two different time intervals are used. Each time interval is related to the way that the accessible buffer of the link responds to changes in the number of cell arrivals per time interval. One time interval is a long time interval and is used to determine the aforementioned steady-state variance/burstiness parameter. The other time interval is a short time interval and is used to determine the aforementioned transient variance/burstiness parameter (e.g., when a burst is in progress).

In a typical ATM system having a traffic source with a peak rate of 15 million bits/second, a sustainable rate of 1 million bits/second and a maximum burst length of 10 cells, the long time interval might typically be 0.256 millisecond (1 burst in length). This results in a steady-state variance/ burstiness of the number of cells to arrive at the link from this source over the long time interval equal to 24.3. In the aforesaid ATM system, the short time interval might typically be instantaneous and results in a transient variance/ burstiness for this instantaneous time interval, for a burst which is known to be in progress, equal to 0.

The attached Appendix A lists both a representative variance/burstiness algorithm $\alpha_\tau$ and an acceptability algorithm usable with the above-mentioned ATM system and for an outgoing link having a single shared buffer. This buffer is served on a first-come, first-serve basis as cells are transmitted onto the link.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, while the burst length parameter used for each traffic source in the system 1 of FIGS. 1–4 is the maximum burst length of the traffic, other burst length parameters might have also been used with or as alternative to the maximum burst length parameter. In particular, one such other burst length parameter is a parameter indicative of or related to the probability distribution of the burst length.

Appendix A

Variance/Burstiness Algorithm for Calculating $\alpha_\tau$ for a Requesting Connection The following algorithm applies to an Asynchronous Transfer Mode system with a single shared buffer that is served on a first-come, first-served basis as cells are transmitted on the buffer's outgoing link.

The following definitions are used throughout the algorithm $\bar{\lambda}$=the requesting connection's sustainable rate; $\hat{\lambda}$=the requesting connection's peak rate; $\hat{B}$=the requesting connection's maximum burst length (at the peak rate); B=the link buffer size in cells, for the buffer being shared by the connections being multiplexed together; μ=the link rate for the link being shared. It is assumed that the rate quantities have been scaled into appropriate units (e.g., cells/millisecond).

1. If $\hat{\lambda} < 1.01\bar{\lambda}$, then set $\hat{\lambda} = 1.01\bar{\lambda}$. That is, set the peak rate to some nominal amount greater than the sustainable rate.

2. Calculate $$K = \lfloor \frac{B+1}{\hat{B}} + \mu \frac{\hat{B}-1}{\bar{\lambda}\hat{B}} \rfloor$$

3. Calculate $$n_{peak} = \lfloor \mu/\hat{\lambda} \rfloor$$

4. Calculate $$\epsilon = 1 - \sum_{j=0}^{n_{peak}} \binom{K+1}{j} p^j (1-p)^{K-j}; p = \bar{\lambda}/\hat{\lambda}$$

5. Calculate two approximate bounds on $\alpha_\tau$, term them $\hat{\alpha}$ for the upper bound and $\alpha$ for 6. Calculate another upper bound on $\alpha_\tau$:

$$\alpha_{peak} = \frac{2(B+1)(\bar{\lambda} - \hat{\lambda})}{-50.7}$$

7. From these three bounds, estimate $\alpha_\tau$:
   Temporarily set/ $\hat{B}=B$ if $\hat{B}>B$ and then recalculate $\alpha$ (Step 5) and assign the resulting $\alpha$ to $\alpha_{test}$.

8. If $\alpha_{peak} > \alpha_{test}$ and $\epsilon < 10^{-11}$ and $\hat{B} > B$ then set $\alpha = \alpha_{test}$ recalculate $\alpha$ (Step 5) while setting $\hat{B}=B$ for the calculation.

9. Set $\alpha_{old} = \alpha$.

10. If $\alpha_{peak} \geq \alpha$ then $\hat{\alpha} = \min(\hat{\alpha}, \alpha_{peak})$ else $\alpha/1.2$.

11. If $\epsilon < 10^{-11}$ then $\hat{\alpha} = \alpha/1.2$.

12. $\hat{\alpha} = \min(\hat{\alpha}, \alpha_{peak})$, $\alpha = \min(\alpha, \alpha_{peak})$.

13. Assign values to new upper and lower bounds ($\alpha_1$ and $\alpha_2$): $\alpha_1 = 1.2 \hat{\alpha}$, $\alpha_2 0.8 \alpha$.

14. Interpolate between $\alpha_1$ and $\alpha_2$ with a factor f:

$$f = \sqrt{\min\left(\frac{\hat{B}}{B}, 1\right)}$$

If $\alpha_{old} > \alpha_{peak}$ then $\alpha_1 = \hat{\alpha}$.

15. Interpolate between $\alpha_1$ and $\alpha_2$ to determine $\alpha_\tau$: $\alpha_{96} = f\alpha_1 + (1-f)\alpha_2$ the lower bound:

$$\hat{\alpha} = \hat{B}^2 p(1-p)/(\hat{B}/\hat{\lambda})$$

Setup quantities for use below: $\tau = 1/\hat{\lambda}$, $T = \hat{B}/\lambda$, $\delta = \hat{B}/\hat{\lambda}$. If $2\delta \leq T$ then $$\check{\alpha} = \frac{\frac{p}{3}(2\hat{B}^2 + 1) - (p\hat{B})^2}{\delta}$$

else $$F_1 = \lfloor \frac{T-\delta}{\tau} \rfloor$$

$$C_1 = F_1 + 1$$

$$F_2 = \lfloor \frac{2\delta - T}{\tau} \rfloor$$

if $\left| F_1 - \frac{T-\delta}{\tau} \right| < 0.0000001$ then set $C_1 = F_1$ $$N_1 = \hat{B} - \frac{C_1 + 1}{2}$$

$$N_2 = \hat{B} - F_1$$

$$N_3 = \frac{\hat{B} + F_2}{2}$$

$$N_{21} = \hat{B}^2 - \hat{B}C_1 + \frac{C_1^2}{3} - \hat{B} + \frac{C_1}{2} + \frac{1}{6}$$

$$N_{22} = (\hat{B} - F_1)^2$$

$$N_{23} = \frac{2\hat{B}^2 + \hat{B} + 2\hat{B}F_2 - F_2 + 2F_2^2}{6}$$

$$N = N_1 \frac{T-\delta}{T} + N_2 \frac{2\delta - T}{T} + N_3 \frac{T-\delta}{T}$$

$$N' = N_{21} \frac{T-\delta}{T} + N_{22} \frac{2\delta - T}{T} + N_{23} \frac{T-\delta}{T}$$

$$\check{\alpha} = \frac{N' - N^2}{\delta}$$

Algorithm for Calculating a $QOS_T$ for Requesting Connection

For this algorithm, the $QOS_T$ of a requesting connection is equated to the inverse of the Cell Loss Ratio (the fraction of a connection's cells that will be lost due to buffer overflow) for a requesting connection.

Also, in the algorithm the Cell Loss Ratio is indicated as CLR, the terms $\alpha_{SSL}$, $\beta_{SSL}$, $\alpha_{SSN}$, $\beta_{SSN}$, $\alpha_t$ and $\beta_t$ are as defined in the specification and terms used in the $\alpha_\tau$ algorithm have the same meanings as given therein, $$QOS_T = \frac{1}{CLR}$$

$$CLR = \frac{\sum_{j=0}^{\hat{B}-1} 1 - G(C-1, b, a)}{\hat{B}}$$

where $$G(x, y, z) = \frac{1 - e^{2\frac{yx}{z}}}{1 - e^{2\frac{yC}{z}}}$$

$$a = \begin{cases} (\alpha_{SSL} + \alpha_\tau \gamma) c_f & \text{if } \hat{\lambda} < \mu \\ (\alpha_{SSL} + \alpha_\tau (1-\delta)) c_f & \text{if } \hat{\lambda} \geq \mu \end{cases}$$

$$b = \begin{cases} (\beta_t + \mu)(1-\gamma) + (\beta_{SSN} + \mu)\gamma - \mu & \text{if } \hat{\lambda} < \mu \\ \beta_{SSL} + \hat{\lambda}\delta & \text{if } \hat{\lambda} \geq \mu \end{cases}$$

$$\delta = \frac{j/\hat{\lambda}}{1.1C/\beta_t}$$

$$\gamma = e^{-(\frac{1}{2})(\frac{\beta_{SSN}^2}{\alpha_{SSN}} + \alpha_{SSN} \frac{\pi^2}{c^2})\frac{j}{\lambda}}$$

-continued $$c_f = \frac{2}{\ln(\beta_{SSN}/\mu + 1)} \frac{\beta_{SSN}}{\beta_{SSN} + 2\mu}$$

$$C = \begin{cases} B & \text{if } \check{\alpha}_{old} > \alpha_{peak} \\ \max\left(B, \frac{\ln\frac{10^{-16}}{1-e^{2\frac{K\bar{\lambda}-\mu}{K\alpha_\tau}}}}{2\frac{K\bar{\lambda}-\mu}{K\alpha_\tau}}\right) & \text{if } \check{\alpha}_{old} \leq \alpha_{peak} \end{cases}$$

What is claimed is:

1. A communication system for use with at least one traffic source, each said traffic source having basic traffic parameters including a parameter indicative of the burstiness of traffic from that traffic source, each said traffic source generating a connection request associated with the coupling of traffic from that traffic source to an outgoing link, the communication system comprising:

at least one outgoing link, each said outgoing link having a link rate;

an aggregating network coupled to each outgoing link and responsive to each traffic source, said aggregating network selectively coupling the traffic from a traffic source to an outgoing link in response to a connection request associated with that traffic source and with that outgoing link and in response to a connection acceptance/rejection decision associated with that connection request, said connection acceptance/rejection decision if a connection acceptance allowing said aggregating network to couple traffic from that traffic source to that outgoing link and if a connection rejection inhibiting said aggregating network from coupling that traffic from that traffic source to that outgoing link; and a controller for making a connection acceptance/rejection decision for a connection request of a traffic source from parameters based on at least the basic traffic parameters of that traffic source, said basic traffic parameters including the sustainable rate of traffic from that traffic source, the peak rate of traffic from that traffic source and a burst length parameter of the traffic from that traffic source;

said controller maintaining first and second current link parameters for each outgoing link, said first current link parameter being indicative of the steady-state mean/average of traffic currently on that outgoing link and said second current link parameter being indicative of the steady-state variance/burstiness of traffic currently on that outgoing link, said second current link parameter being determined by said controller based on at least said basic traffic parameters of each traffic source whose traffic is currently coupled to that outgoing link and said first current link parameter being determined by said controller based on at least the sustainable rate of traffic of each traffic source whose traffic is currently coupled to that outgoing link and the link rate of that outgoing link;

and said controller in making a connection acceptance/rejection decision based on a connection request of a given traffic source and associated with a given outgoing link: calculating a second new link parameter based on the second current link parameter for that given outgoing link and the basic traffic parameters for that given traffic source; calculating a first new link parameter for that given outgoing link based on the first current link parameter for that given outgoing link and the sustainable rate of traffic for that given traffic source; and using said first and second new link parameters and the basic traffic parameters of that given traffic source in making said connection acceptance/rejection decision.

2. A communication system in accordance with claim 1 wherein:

said burst length parameter for a traffic source is one of the maximum burst length of traffic for that traffic source and a parameter related to the probability distribution of the burst length of traffic for that traffic source.

3. A communication system in accordance with claim 1 wherein:

said controller is included in said aggregating network.

4. A communication system in accordance with claim 1 wherein:

said basic traffic parameters of a traffic source are included in a traffic descriptor;

and said controller is responsive to the traffic descriptor of a traffic source for which a connection acceptance/rejection decision is being made by said controller.

5. A communication system in accordance with claim 4 wherein:

each connection request of a traffic source includes the traffic descriptor for the basic traffic parameters of that traffic source.

6. A communication system in accordance with claim 4 further comprising:

an administrative system for storing the traffic descriptor of each traffic source;

and said controller is responsive to said administrative system.

7. A communication system in accordance with claim 1 wherein:

said controller, if said connection acceptance/rejection decision for said given traffic source is a connection acceptance, causing the first new link parameter to be said first current link parameter and said second new link parameter to be said second current link parameter.

8. A communication system in accordance with claim 1 wherein:

said controller, in making said connection acceptance/rejection decision further: determining a second transient link parameter equal to the second current link parameter; determining a first transient link parameter equal to the sum of the first current link parameter and the peak rate of the traffic of the given traffic source; and using said first and second transient link parameters in making said connection acceptance/rejection decision.

9. A communication system in accordance with claim 8 wherein:

each said outgoing link has an accessible storage buffer size;

and said calculating by said controller of said second new link parameter for said given outgoing link is also based on the accessible storage buffer size and link rate of that given outgoing link.

10. A communication system in accordance with claim 9 wherein:

said calculating by said controller of said second new link parameter includes adding the second current link parameter to a variance/burstiness parameter determined from a predetermined variance/burstiness algorithm, the basic traffic parameters of the given traffic source and the accessible storage buffer size and link rate of the given outgoing link.

11. A communication system in accordance with claim 10 wherein:

each traffic source has a quality of service traffic parameter;

and said controller in making a connection acceptance/rejection decision for said given traffic source uses the quality of service traffic parameter of the given traffic source.

12. A communication system in accordance with claim 11 wherein:

said controller in making a connection acceptance/rejection decision for said given traffic source: uses said first and second new link parameters, said first and second transient link parameters and said basic traffic parameters of said given traffic source to determine a quality of service parameter; and compares the quality of service parameter for the given traffic source with the determined quality of service parameter.

13. A communication system in accordance with claim 12 wherein:

said controller makes a connection acceptance decision when the determined quality of service parameter is equal to or greater than the quality of service parameter for the given traffic source and makes a connection rejection decision when the determined quality of service parameter is less than the quality of service parameter for the given traffic source.

14. A communication system in accordance with claim 13 wherein:

said controller includes an acceptability algorithm which calculates from said first and second new link parameters, from said first and second transient link parameters and from the basic traffic parameters of the given traffic source the quality of service parameter for the given traffic source.

15. A communication system in accordance with claim 14 wherein:

said controller provides as an output one or more of said connection acceptance/rejection decision and the determined quality of service parameter.

16. A communication system in accordance with claim 13 wherein:

said controller: makes a connection acceptance decision when the determined quality of service parameter is equal to or greater than the quality of service parameter for the given traffic source and determinable quality of service parameters for the other traffic sources currently coupled to the given link are equal to or greater than respective quality of service parameters for said other traffic sources, said determinable quality of service parameters being based on the first and second new link parameters of the given link for the given traffic source, the first and second transient link parameters of the given link for said other traffic sources and the basic traffic parameters of said other traffic sources; and makes a connection rejection decision when the determined quality of service parameter is less than the quality of service parameter for the given traffic source or a determinable quality of service parameter for any other traffic source currently coupled to the given link is less than the quality of service parameter for said other traffic source, said determinable quality of service parameter being based on the first and second new link parameters of the given link for the given traffic source, first and second transient link parameters of the given link for said other traffic source and the basic traffic parameters of said other traffic source.

17. A communication system in accordance with claim 1 wherein:

said aggregating network is a switching network including one of a digital switch, a multiplexor and a concentrator.

18. A communication system in accordance with claim 17 wherein:

each said traffic source is one of a computer, telephone, video coder/decoder and communication system element.

19. A communication system in accordance with claim 1 further comprising:

at least one outgoing further link;

a further aggregating network coupled to an outgoing further link and responsive to a given outgoing link, said further aggregating network selectively coupling traffic from that given outgoing link to said outgoing further link in response to a connection request and in response to a further connection acceptance/rejection decision associated with that connection request, said further connection acceptance/rejection decision if a further connection acceptance allowing said further aggregating network to couple traffic from that given outgoing link to that outgoing further link and if a further connection rejection inhibiting said further aggregating network from coupling traffic from that given outgoing link to that outgoing further link;

and said controller making said further connection acceptance/rejection decision for a connection request from parameters which are based at least on derived basic traffic parameters of said given outgoing link, said derived basic traffic parameters including a parameter indicative of the burstiness of traffic on said given outgoing link.

20. A communication system in accordance with claim 19 wherein:

if said controller, when responding to any connection request requiring coupling of traffic through both said aggregating and further aggregating networks, reaches a connection rejection decision and/or a further connection rejection decision, then said controller outputs a connection rejection and further connection rejection decision to said aggregating and further aggregating networks respectively.

21. A communication method for use with at least one traffic source and at least one outgoing link, each said outgoing link having a link rate, each said traffic source having basic traffic parameters including a parameter indicative of the burstiness of traffic from that traffic source, each said traffic source generating a connection request associated with the coupling of traffic from that traffic source to an outgoing link, the method comprising:

selectively coupling the traffic from a traffic source to an outgoing link in response to a connection request associated with that traffic source and that outgoing link and in response to a connection acceptance/rejection decision associated with that connection request, said selective coupling including: allowing said coupling if the connection acceptance/rejection decision is a connection acceptance; and inhibiting said coupling if the connection acceptance/rejection decision is a connection rejection; and making a connection acceptance/rejection decision for a connection request of a traffic source from parameters which are based on at least the basic traffic parameters of that traffic source, said basic traffic parameters of that traffic source including the sustainable rate of traffic from that traffic source, the peak rate of traffic from that traffic source, and a burst length parameter of traffic from that traffic source, said step of making said connection acceptance/rejection decision including maintaining first and second current link parameters for each outgoing link, said first current link parameter being indicative of the steady-state mean/average of traffic currently on that outgoing link and said second current link parameter being indicative of the steady-state variance/burstiness of traffic currently on that outgoing link, said second current link parameter being determined based on at least said basic traffic parameters of each traffic source whose traffic is currently Coupled to that outgoing link and said first link parameter being determined based on at least the sustainable rate of traffic of each traffic source whose traffic is currently coupled to that outgoing link and the link rate of that outgoing link;

and said step of making said connection acceptance/rejection decision further including: making a connection acceptance/rejection decision based on a connection request of a given traffic source and associated with a given outgoing link by: calculating a second new link parameter based on the second current link parameter for that given outgoing link and the basic traffic parameters for that given traffic source; calculating a first new link parameter for that given outgoing link based on the first current link parameter for that given outgoing link and the sustainable rate of traffic for that given traffic source; and using said first and second new link parameters and the basic traffic parameters of that given traffic source in making said connection acceptance/rejection decision.

22. A communication method in accordance with claim 21 wherein:

said burst length parameter for a traffic source is one of the maximum burst length of traffic for that traffic source and/or a parameter related to the probability distribution of the burst length of traffic for that traffic source.

23. A communication method in accordance with claim 21 wherein:

said basic traffic parameters of a traffic source are included in a traffic descriptor;

and said step of making a connection acceptance/rejection decision utilizes the traffic descriptor of a traffic source for which a connection acceptance/rejection decision is being made.

24. A communication method in accordance with claim 23 wherein:

each connection request of a traffic source includes the traffic descriptor for the basic traffic parameters of that traffic source.

25. A communication method in accordance with claim 23 wherein:

said method further comprises storing the traffic descriptor of each traffic source;

and said step of making said connection acceptance/rejection decision selectively utilizes said stored traffic descriptors.

26. A communication method in accordance with claim 21 wherein:

step of making said connection acceptance/rejection decision further includes: if said connection acceptance/rejection decision for said given traffic source is a connection acceptance, causing the first new link parameter to be said first current link parameter and said second new link parameter to be said second current link parameter.

27. A communication method in accordance with claim 21 wherein:

said step of making said connection acceptance/rejection decision further includes: determining a second transient link parameter equal to the second current link parameter; determining a first transient link parameter equal to the sum of the first current link parameter and the peak rate of the traffic of the given traffic source; and using said first and second transient link parameters in making said connection acceptance/rejection decision.

28. A communication method in accordance with claim 27 wherein:

each said outgoing link has an accessible storage buffer size;

and said calculating of said second new link parameter for said given outgoing telephone link is also based on the accessible storage buffer size and link rate of that given outgoing link.

29. A communication method in accordance with claim 28 wherein:

said calculating of said second new link parameter includes adding the second current link parameter to a variance/burstiness parameter determined from a predetermined variance/burstiness algorithm, the basic traffic parameters of the given traffic source and the accessible storage buffer size and link rate of the given outgoing telephone link.

30. A communication method in accordance with claim 29 wherein:

each traffic source has a quality of service traffic parameter;

and said step of making said connection acceptance/rejection decision for a given traffic source uses the quality of service traffic parameter of the given traffic source.

31. A communication method in accordance with claim 30 wherein:

said step of making said connection acceptance/rejection decision further includes: using said first and second new link parameters, said first and second transient link parameters and said basic traffic parameters of said given traffic source to determine a quality of service parameter; and comparing the quality of service parameter for the given traffic source with the determined quality of service parameter.

32. A communication method in accordance with claim 31 wherein:

said step of making said connection acceptance/rejection decision results in a connection acceptance decision when the determined quality of service parameter is equal to or greater than the quality of service parameter for the given traffic source and in a connection rejection decision when the determined quality of service parameter is less than the quality of service parameter for the given traffic source.

33. A communication method in accordance with claim 32 wherein:

said step of making said connection acceptance/rejection decision includes: using an acceptability algorithm to calculate from said first and second new link parameters, first and second transient link parameters and basic traffic parameters of the given traffic source the quality of service parameter for the given traffic source.

34. A communication method in accordance with claim 33 wherein:

said step of making said connection acceptance/rejection decision provides as an output one or more of said connection acceptance/rejection decision and the determined quality of service parameter.

35. A communication method in accordance with claim 32 wherein:

said step of making said connection acceptance/rejection decision includes: making a connection acceptance decision when the determined quality of service parameter is equal to or greater than the quality of service parameter for the given traffic source and determinable quality of service parameters for the other traffic sources currently coupled to the given link are equal to or greater than respective quality of service parameters for said other traffic sources, said determinable quality of service parameters being based on the first and second new link parameters of the given link for the given traffic source, the first and second transient link parameters of the given link for said other traffic sources and the basic traffic parameters of said other traffic sources; and making a connection rejection decision when the determined quality of service parameter is less than the quality of service parameter for the given traffic source or a determinable quality of service parameter for any other traffic source currently coupled to the given link quality of service parameter for said other traffic source, said determinable quality of service parameters being based on the first and second new link parameters of the given link for the given traffic source, the first and second transient link parameters of the given link for said other traffic source and the basic traffic parameters of said other traffic source.

36. A communication method in accordance with claim 21 for use with at least one outgoing further link, said communication method further comprising:

further selectively coupling traffic from a given outgoing link to said outgoing further link in response to a connection request and in response to a further connection acceptance/rejection decision associated with that connection request, said further connection acceptance/rejection decision if a further connection acceptance allowing the coupling of traffic from that given outgoing link to that outgoing further link and if a further connection rejection inhibiting said coupling of traffic from that given outgoing link to that outgoing further link;

and making a further connection acceptance/rejection decision for a connection request from parameters which are based at least on derived basic traffic parameters of said given outgoing link, said derived basic traffic parameters including a parameter indicative of the burstiness of traffic on said given outgoing link.

37. A communication method in accordance with claim 36 wherein:

if any connection request requires both said connection acceptance/rejection and said further connection acceptance/rejection decisions to be made and either decision is a connection rejection, then both said connection and further connection acceptance/rejection decisions are made as connection rejection decisions.

38. A controller for use in a communication system which is responsive to at least one traffic source, each said traffic source having basic traffic parameters including a parameter indicative of the burstiness of traffic from that traffic source, each said traffic source generating a connection request associated with the coupling of traffic from that traffic source to an outgoing link, the communication system comprising: at least one outgoing link, each said outgoing link having a link rate, and an aggregating network coupled to each outgoing link and responsive to each traffic source, said aggregating network selectively coupling the traffic from a traffic source to an outgoing link in response to a connection request associated with that traffic source and with that outgoing link and in response to a connection acceptance/ rejection decision associated with that connection request, said connection acceptance/rejection decision if a connection acceptance allowing said aggregating network to couple traffic from that traffic source to that outgoing link and if a connection rejection inhibiting said aggregating network from coupling that traffic from that traffic source to that outgoing link; said controller comprising:

a receiving functionality responsive to a connection request of a traffic source; and a decision functionality responsive to said receiving functionality for making a connection acceptance/ rejection decision for a connection request of a traffic source from parameters based on at least the basic traffic parameters of that traffic source, said basic traffic parameters of a traffic source including the sustainable rate of traffic from that traffic source, the peak rate of traffic from that traffic source, and a burst length parameter of traffic from that traffic source, said decision functionality maintaining first and second current link parameters for each outgoing link, said first current link parameter being indicative of the steady-state mean/average of traffic currently on that outgoing link and said second current link parameter being indicative of the steady-state variance/burstiness of traffic currently on that outgoing link, said second current, link parameter being determined by said decision functionality based on at least said basic traffic parameters of each traffic source whose traffic is currently coupled to that outgoing link and said first link parameter being determined by said functionality based on at least the sustainable rate of traffic of each traffic source whose traffic is currently coupled to that outgoing link and the link rate of that outgoing link;

and said decision functionality in making a connection acceptance/rejection decision based on a connection request of a given traffic source and associated with a given outgoing link: calculating a second new link parameter based on the second current link parameter for that given outgoing link and the basic traffic parameters for that given traffic source; calculating a first new link parameter for that given outgoing link based on the first current link parameter for that given outgoing link and the sustainable rate of traffic for that given traffic source; and using said first and second new link parameters and the basic traffic parameters for that traffic source in making said connection acceptance/rejection decision.

39. A controller in accordance with claim 38 wherein:

said burst length parameter for a traffic source is one of the maximum burst length of traffic for that traffic source and/or a parameter related to the probability distribution of the burst length of traffic for the traffic source.

40. A controller in accordance with claim 38 wherein:

said basic traffic parameters of a traffic source are included in a traffic descriptor;

and said receiving functionality is responsive to the traffic descriptor of a traffic source for which a connection acceptance/rejection decision is being made by said controller.

41. A controller in accordance with claim 40 wherein:

each connection request of a traffic source includes the traffic descriptor for the basic traffic parameters of that traffic source.

42. A controller in accordance with claim 40 wherein:

an administrative system stores the traffic descriptor of each traffic source;

and said receiving functionality is responsive to said administrative system.

43. A controller accordance with claim 38 wherein:

said decision functionality, if said connection acceptance/rejection decision for said given traffic source is a connection acceptance, causing the first new link parameter to be said first current link parameter and said second new link parameter to be said second current link parameter.

44. A controller in accordance with claim 38 wherein:

said decision functionality, in making said connection acceptance/rejection decision further: determining a second transient link parameter equal to the second current link parameter; determining a first transient link parameter equal to the sum of the first current link parameter and the peak rate of the traffic of the given traffic source; and using said first and second transient link parameters in making said connection acceptance/rejection decision.

45. A controller accordance with claim 44 wherein:

each said outgoing link has an accessible storage buffer size;

and said calculating by said decision functionality of said second new link parameter for said given outgoing link is also based on the accessible storage buffer size and link rate of that given outgoing link.

46. A controller in accordance with claim 45 wherein:

said calculating by said decision functionality of said second new link parameter includes adding the second current link parameter to a variance/burstiness parameter determined from a predetermined variance/burstiness algorithm, the basic traffic parameters of the given traffic source and the accessible storage buffer size and link rate of the given outgoing link.

47. A controller in accordance with claim 46 wherein:

each traffic source has a quality of service traffic parameter;

and said decision functionality in making a connection acceptance/rejection decision for said given traffic source uses the quality of service traffic parameter of the given traffic source.

48. A controller in accordance with claim 47 wherein:

said decision functionality in making a connection acceptance/rejection decision for said given traffic source: uses said first and second new link parameters, said first and second transient link parameters and said basic traffic parameters of said given traffic source to determine a quality of service parameter; and compares the quality of service parameter for the given traffic source with the determined quality of service parameter.

49. A controller in accordance with claim 48 wherein:

said decision functionality makes a connection acceptance decision when the determined quality of service parameter is equal to or greater than the quality of service parameter for the given traffic source and makes a connection rejection decision when the determined quality of service parameter is less than the quality of service parameter for the given traffic source.

50. A controller in accordance with claim 49 wherein:

said decision functionality includes an acceptability algorithm which calculates from said first and second new link parameters, from said first and second transient link parameters and from the basic traffic parameters of the given traffic source the quality of service parameter for the given traffic source.

51. A controller in accordance with claim 50 wherein:

said decision functionality provides as an output one or more of said connection acceptance/rejection decision and the determined quality of service parameter.

52. A controller in accordance with claim 49 wherein:

said controller: makes a connection acceptance decision when the determined quality of service parameter is equal to or greater than the quality of service parameter for the given traffic source and determinable quality of service parameters for the other traffic sources currently coupled to the given link are equal to or greater than respective quality of service parameters for said other traffic sources, said determinable quality of service parameters being based on the first and second new link parameters of the given link for the given traffic source, the first and second transient link parameters of the given link for said other traffic sources and the basic traffic parameters of said other traffic sources; and makes a connection rejection decision when the determined quality of service parameter is less than the quality of service parameter for the given traffic source or a determinable quality of service parameter for any other traffic source currently coupled to the given link is less than the quality of service parameter for said other traffic source, said determinable quality of service parameter being based on the first and second new link parameters of the given link for the given traffic source, the first and second transient link parameters of the given link for said other traffic source and the basic traffic parameters of said other traffic source.

53. A controller in accordance with claim 38 wherein said communication system further includes: at least one outgoing further link; and a further aggregating network coupled to an outgoing further link and responsive to a given outgoing link, said aggregating network selectively coupling traffic from that given outgoing link to said outgoing further link in response to a connection request and in response to a further connection acceptance/rejection decision associated with that connection request, said further connection acceptance/rejection decision if a further connection acceptance allowing said further aggregating network to couple traffic from that given outgoing link to that outgoing further link and if a further connection rejection inhibiting said further aggregating network from coupling traffic from that given outgoing link to that outgoing further link; and wherein:

said decision functionality making a further connection acceptance/rejection decision for a connection request from parameters which are based on at least derived basic traffic parameters of said given outgoing link, said derived basic traffic parameters including a parameter indicative of the burstiness of traffic on said given outgoing link.

54. A controller in accordance with claim 53 wherein:

if said decision functionality, when responding to any connection request requiring coupling of traffic through both said aggregating and further aggregating networks, reaches a connection rejection decision and/or a further connection rejection decision, then said decision functionality outputs a connection rejection and further connection rejection decision to said aggregating and further aggregating networks, respectively.

55. A communication method for use with at least one traffic source and at least one outgoing link, each said outgoing link having a link rate, each said traffic source having basic traffic parameters including a parameter indicative of the burstiness of traffic from that traffic source, each said traffic source generating a connection request associated with the coupling of traffic from that traffic source to an outgoing link, and for use with an aggregating network for selectively coupling the traffic from a traffic source to an outgoing link in response to a connection request associated with that traffic source and that outgoing link and in response to a connection acceptance/rejection decision associated with that connection request, said selective coupling including: allowing said coupling if the connection acceptance/rejection decision is a connection acceptance; and inhibiting said coupling if the connection acceptance/rejection decision is a connection rejection: said method comprising:

receiving a connection request of a traffic source; and making a connection acceptance/rejection decision for said received connection request of that traffic source from parameters which are based on at least the basic traffic parameters of that traffic source, said basic traffic parameters of a traffic source including the sustainable rate of traffic from that traffic source, the peak rate of traffic from that traffic source, and a burst length parameter of traffic from that traffic source;

said step of making said connection acceptance/rejection decision including maintaining first and second current link parameters for each outgoing link, said first current link parameter being indicative of the steady-state mean/average of traffic currently on that outgoing link and said second current link parameter being indicative of the steady-state variance/burstiness of traffic currently on that outgoing link, said second current link parameter being determined based on at least said basic traffic parameters of each traffic source whose traffic is currently coupled to that outgoing link and said first link parameter being determined based on at least the sustainable rate of traffic of each traffic source whose traffic is currently coupled to that outgoing link and the link rate of that outgoing link;

and said step of making said connection acceptance/rejection decision further including making a connection acceptance/rejection decision based on a connection request of a given traffic source and associated with a given outgoing link by: calculating a second new link parameter based on the second current link parameter for that given outgoing link and the basic traffic parameters for that given traffic source; calculating a first new link parameter for that given outgoing link based on the first current link parameter for that given outgoing link and the sustainable rate of traffic for that given traffic source; and using said first and second new link parameters and the basic traffic parameters of that traffic source in making said connection acceptance/rejection decision.

56. A communication method in accordance with claim 55 wherein:

said burst length parameter for a traffic source is one of the maximum burst length of traffic for that traffic source and/or a parameter related to of the probability distribution of the burst length of traffic for the traffic source.

57. A communication method in accordance with claim 55 wherein:

said basic traffic parameters of a traffic source are included in a traffic descriptor;

and said step of making a connection acceptance/rejection decision utilizes the traffic descriptor of a traffic source for which a connection acceptance/rejection decision is being made.

58. A communication method in accordance with claim 57 wherein:

each connection request of a traffic source includes the traffic descriptor for the basic traffic parameters of that traffic source.

59. A communication method in accordance with claim 57 wherein:

said method further comprises storing the traffic descriptor of each traffic source;

and said step of making said connection acceptance/rejection decision selectively utilizes said stored traffic descriptors.

60. A communication method in accordance with claim 55 wherein:

said step of making said connection acceptance/rejection decision further includes: if said connection acceptance/rejection decision for said given traffic source is a connection acceptance, causing the first new link parameter to be said first current link parameter and said second new link parameter to be said second current link parameter.

61. A communication method in accordance with claim 55 wherein:

said step of making said connection acceptance/rejection decision further includes: determining a second transient link parameter equal to the second current link parameter; determining a first transient link parameter equal to the sum of the first current link parameter and the peak rate of the traffic of the given traffic source; and using said first and second transient link parameters in making said connection acceptance/rejection decision.

62. A communication method in accordance with claim 61 wherein:

each said outgoing link has an accessible storage buffer size;

and said calculating of said second new link parameter for said given outgoing link is also based on the accessible storage buffer size and link rate of that given outgoing link.

63. A communication method in accordance with claim 62 wherein:

said calculating of said second new link parameter includes adding the second current link parameter to a variance/burstiness parameter determined from a predetermined variance/burstiness algorithm, the basic traffic parameters of the given traffic source and the accessible storage buffer size and link rate of the given outgoing link.

64. A communication method in accordance with claim 63 wherein:

each traffic source has a quality of service traffic parameter;

and said step of making said connection acceptance/ rejection decision for a given traffic source uses the quality of service traffic parameter of the given traffic source.

65. A communication method in accordance with claim 64 wherein:

said step of making said connection acceptance/rejection decision further includes: using said first and second new link parameters, said first and second transient link parameters and said basic traffic parameters of said given traffic source to determine a quality of service parameter; and comparing the quality of service parameter for the given traffic source with the determined quality of service parameter.

66. A communication method in accordance with claim 65 wherein:

said step making said connection acceptance/rejection decision results in a connection acceptance decision when the determined quality of service parameter is equal to or greater than the quality of service parameter for the given traffic source and in a connection rejection decision when the determined quality of service parameter is less than the quality of service parameter for the given traffic source.

67. A communication method in accordance with claim 66 wherein:

said step of making said connection acceptance/rejection decision includes: using an acceptability algorithm to calculate from said first and second new link parameters, first and second transient link parameters and basic traffic parameters of the given traffic source the quality of service parameter for the given traffic source.

68. A communication method in accordance with claim 67 wherein:

said step of making said connection acceptance/rejection decision provides as an output one or more of said connection acceptance/rejection decision and the determined quality of service parameter.

69. A communication method in accordance with claim 66 wherein:

said step of making said connection acceptance/rejection decision includes: making a connection acceptance decision when the determined quality of service parameter is equal to or greater than the quality of service parameter for the given traffic source and determinable quality of service parameters for the other traffic sources currently coupled to the given link are equal to or greater than respective quality of service parameters for said other traffic sources, said determinable quality of service parameters being based on the first and second new link parameters of the given link for the given source, the first and second transient link parameters of the given link for said other traffic sources and the basic traffic parameters of said other traffic sources: and making a connection rejection decision when the determined quality of service parameter is less than the quality of service parameter for the given traffic source or when a determinable quality of service parameter for any other traffic source currently coupled to the given link is less than the quality of service parameter for said other traffic source, said determinable quality of service parameter being based on the first and second new link parameters of the given link for the given source, the first and second transient link parameters of the given link for said other source and the basic traffic parameters of said other traffic source.

70. A communication method in accordance with claim 55 for use with at least one outgoing further link and with a further aggregating network for further selectively coupling traffic from a given outgoing link to said outgoing further link in response to a connection request and in response to a further connection acceptance/rejection decision associated with that connection request, said further connection acceptance/rejection decision if a further connection acceptance allowing the coupling of traffic from that given outgoing link to that outgoing further link and if a further connection rejection inhibiting said coupling of traffic from that given outgoing link to that outgoing further link; said method further comprising:

making a further connection/rejection decision for a connection request from parameters which are based at least on derived basic traffic parameters of said given outgoing link, said derived basic traffic parameters including a parameter indicative of the burstiness of traffic on said given outgoing telephone link.

71. A communication method in accordance with claim 70 wherein:

if any connection request requires both said connection acceptance/rejection and said further connection acceptance/rejection decisions to be made and either decision is a connection rejection, then both said connection and further connection acceptance/rejection decisions are made as connection rejection decisions.

\* \* \* \* \*

UNITED STATES PATENT AND TRADEMARK OFFICE
CERTIFICATE OF CORRECTION

PATENT NO. : 5,548,581

DATED : August 20, 1996

INVENTOR(S) : Brad A. Makrucki

It is certified that error appears in the above-identified patent and that said Letters Patent is hereby corrected as shown below:

Col. 6, line 32, change "$QOS_{,T}$" to -- $QOS_T$ --.

Col. 9, line 35, change "$\alpha=\alpha_{test}$" to -- $\hat{\alpha}=\alpha_{test}$ and --.

Col. 9, line 38, change "$\alpha_{old}=\alpha$" to -- $\hat{\alpha}_{old}=\hat{\alpha}$ --.

Col. 9, line 39, change "$\alpha_{peak} \geq \alpha$" to -- $\alpha_{peak} \geq \hat{\alpha}$ -- and change "$\alpha/1.2$" to -- $\hat{\alpha}=\hat{\alpha}/1.2$ --.

Col. 9, line 40, change $\hat{\alpha}=\alpha/1.2$" to -- $\hat{\alpha}=\hat{\alpha}/1.2$ --.

Col. 9, line 41, change "$\alpha=\min(\alpha,\alpha_{peak})$" to -- $\hat{\alpha}=\min(\hat{\alpha},\alpha_{peak})$ --.

Col. 9, line 43, change "$\alpha_2=0.8\alpha$" to -- $\alpha_2=0.8\hat{\alpha}$ --.

Col. 9, line 51, change "$\alpha_{old} > \alpha_{peak}$" to -- $\hat{\alpha}_{old} > \alpha_{peak}$ --.

Col. 15, line 19, change "Coupled" to -- coupled --.

Col. 18, line 41, change "current,link" to -- current link --

Signed and Sealed this

Twenty-fifth Day of March, 1997

BRUCE LEHMAN

*Attest:*

*Attesting Officer*     Commissioner of Patents and Trademarks